(12) United States Patent
Sills et al.

(10) Patent No.: US 9,057,514 B2
(45) Date of Patent: Jun. 16, 2015

(54) SOLID STATE LIGHTS WITH THERMOSIPHON LIQUID COOLING STRUCTURES AND METHODS

(75) Inventors: Scott E. Sills, Boise, ID (US); Anton J. de Villiers, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 218 days.

(21) Appl. No.: 13/542,579

(22) Filed: Jul. 5, 2012

(65) Prior Publication Data

US 2012/0286640 A1 Nov. 15, 2012

Related U.S. Application Data

(63) Continuation of application No. 12/872,647, filed on Aug. 31, 2010, now Pat. No. 8,217,557.

(51) Int. Cl.
| | | |
|---|---|---|
| F21V 29/00 | (2006.01) | |
| F21Y 101/02 | (2006.01) | |
| H04M 1/22 | (2006.01) | |

(52) U.S. Cl.
CPC ............... *F21V 29/58* (2015.01); *F21V 29/006* (2013.01); *F21Y 2101/02* (2013.01); *H04M 1/22* (2013.01)

(58) Field of Classification Search
CPC .............................. F21V 29/006; F21V 29/248
USPC ............................................. 313/12, 512, 484
See application file for complete search history.

(56) References Cited

U.S. PATENT DOCUMENTS

| | | | |
|---|---|---|---|
| 4,879,629 A | 11/1989 | Tustaniwskyj et al. | |
| 5,647,662 A | 7/1997 | Ziegler et al. | |
| 5,890,794 A * | 4/1999 | Abtahi et al. | 362/294 |
| 5,972,736 A | 10/1999 | Malladi et al. | |
| 5,978,220 A | 11/1999 | Frey et al. | |
| 6,055,154 A * | 4/2000 | Azar | 361/688 |
| 6,690,696 B2 | 2/2004 | Byren et al. | |
| 7,304,418 B2 | 12/2007 | Nagata et al. | |
| 7,309,145 B2 * | 12/2007 | Nagata et al. | 362/294 |
| 7,505,268 B2 | 3/2009 | Schick | |
| 7,722,211 B2 * | 5/2010 | Marra et al. | 362/227 |
| 7,878,697 B2 * | 2/2011 | Chiang | 362/555 |
| 7,922,359 B2 * | 4/2011 | Chiang | 362/294 |
| 7,997,750 B2 * | 8/2011 | Chiang | 362/101 |
| 8,602,590 B2 * | 12/2013 | Ghiu et al. | 362/235 |
| 8,651,704 B1 * | 2/2014 | Gordin et al. | 362/294 |
| 2004/0004435 A1 | 1/2004 | Hsu | |
| 2004/0105264 A1 | 6/2004 | Spero | |
| 2004/0264192 A1 * | 12/2004 | Nagata et al. | 362/267 |
| 2005/0158687 A1 | 7/2005 | Dahm | |
| 2005/0168990 A1 * | 8/2005 | Nagata et al. | 362/294 |
| 2006/0176699 A1 * | 8/2006 | Crunk | 362/294 |
| 2006/0274524 A1 * | 12/2006 | Chang et al. | 362/231 |
| 2007/0008713 A1 * | 1/2007 | Doyle | 362/101 |
| 2008/0013316 A1 | 1/2008 | Chiang | |

(Continued)

*Primary Examiner* — Thomas A Hollweg
(74) *Attorney, Agent, or Firm* — Perkins Coie LLP

(57) ABSTRACT

A solid state lighting (SSL) device with a solid state emitter (SSE) being partially exposed in a channel loop, and methods of making and using such SSLs. The SSE can have thermally conductive projections such as fins, posts, or other structures configured to transfer heat into a fluid medium, such as a liquid coolant in the channel loop. The channel loop can include an upward channel in which the SSE is exposed to warm the coolant in the upward channel, and a downward channel through which coolant moves after being cooled by a cooling structure. The coolant in the channel loop can naturally circulate due to the heat from the SSE.

23 Claims, 7 Drawing Sheets

(56) References Cited

U.S. PATENT DOCUMENTS

| | | | |
|---|---|---|---|
| 2008/0144319 A1* | 6/2008 | Chang et al. | 362/294 |
| 2008/0179622 A1 | 7/2008 | Herrmann | |
| 2008/0278954 A1 | 11/2008 | Speier | |
| 2009/0001372 A1 | 1/2009 | Arik et al. | |
| 2009/0059594 A1* | 3/2009 | Lin | 362/294 |
| 2010/0001294 A1 | 1/2010 | Faller et al. | |
| 2010/0044746 A1 | 2/2010 | Steenbruggen | |
| 2010/0225219 A1* | 9/2010 | Hua | 313/46 |
| 2011/0050098 A1* | 3/2011 | Lenk et al. | 315/32 |
| 2011/0193479 A1* | 8/2011 | Nilssen et al. | 315/35 |
| 2012/0002401 A1* | 1/2012 | Clifford | 362/101 |
| 2012/0049715 A1 | 3/2012 | Sills et al. | |

* cited by examiner

SOLID STATE LIGHTS WITH THERMOSIPHON LIQUID COOLING STRUCTURES AND METHODS

CROSS-REFERENCE TO RELATED APPLICATION

This application is a continuation of U.S. application Ser. No. 12/872,647 filed Aug. 31, 2010, now U.S. Pat. No. 8,217,557, which is incorporated herein by reference in its entirety.

TECHNICAL FIELD

The present technology is related to solid state lighting (SSL) devices and associated methods of operation and manufacture. In particular, the present technology is related to cooling SSL devices with one or more solid state emitters (SSEs), such as light emitting diodes.

BACKGROUND

SSL devices and SSEs are increasingly in demand for many purposes because SSEs efficiently produce high-intensity, high-quality light. Mobile phones, personal digital assistants, digital cameras, MP3 players, and other portable devices use SSL devices for background illumination. Applications for SSL devices extend beyond portable electronic devices and include many types of lights, such as ceiling panels, desk lamps, refrigerator lights, table lamps, street lights, and automobile headlights.

There are several types of SSEs, such as semiconductor light-emitting diodes (LEDs), polymer light-emitting diodes (PLEDs), and organic light-emitting diodes (OLEDs). Generally, SSEs generate less heat, provide greater resistance to shock and vibration, and have longer life spans than conventional lighting devices that use filaments, plasma, or gas as sources of illumination (e.g., florescent tubes and incandescent light bulbs).

A conventional type of SSE is a "white light" LED. White light requires a mixture of wavelengths to be perceived as such by human eyes. However, LEDs typically only emit light at one particular wavelength (e.g., blue light), so LEDs must be modified to emulate white light. One conventional technique for doing so includes depositing a converter material (e.g., phosphor) on the LED. For example, as shown in FIG. 1A, a conventional SSL device 10 includes a support 2 carrying an LED 4 and a converter material 6 deposited on the LED 4. The LED 4 can include one or more light emitting components. FIG. 1B is a cross-sectional diagram of a portion of a conventional indium-gallium nitride LED 4. As shown in FIG. 1B, the LED 4 includes a substrate 12, an N-type gallium nitride (GaN) material 14, an indium gallium nitride (InGaN) material 16 (and/or GaN multiple quantum wells), and a P-type GaN material 18 on one another in series. Conventional substrates 12 are comprised of sapphire or silicon. The LED 4 can further include a first contact 20 on the P-type GaN material 18 and a second contact 22 on the N-type GaN material 14. Referring to both FIGS. 1A and 1B, the InGaN material 16 of the LED 4 emits a blue light that stimulates the converter material 6 to emit a light (e.g., a yellow light) at a desired frequency. The combination of the blue and yellow emissions appears white to human eyes if matched appropriately.

Although LEDs produce less heat than conventional lighting devices, LEDs can produce enough heat to increase the rate at which some of the heat sensitive semiconductor and optical components deteriorate. The converter material 6, for example, deteriorates relatively rapidly at higher temperatures, and over time the converter material 6 may emit light at a different frequency than the desired frequency. The combined emissions accordingly appear off-white and may reduce the color fidelity of electronic devices. The junctions in the semiconductor materials that produce the light also deteriorate at higher temperatures. Therefore, it would be desirable to improve the cooling in SSEs and/or SSL devices.

DETAILED DESCRIPTION

Various embodiments of solid state lights ("SSLs") and associated methods of manufacturing SSLs are described below. The term "SSL" generally refers to "solid state light" and/or "solid state lighting" according to the context in which it is used. The terms "SSL emitter" or "solid state emitter" ("SSE") generally refer to solid state components that convert electrical energy into electromagnetic radiation in the visible, ultraviolet, infrared and/or other spectra. SSEs include light-emitting diodes (LEDs), which are semiconductor diodes that convert electrical energy into electromagnetic radiation in a desired spectrum. SSEs can also include polymer light-emitting diodes (PLEDs) and organic light-emitting diodes (OLEDs). The term "phosphor" generally refers to a material that can continue emitting light after exposure to energy (e.g., electrons and/or photons). A person skilled in the relevant art will understand that the new technology may have additional embodiments and that the new technology may be practiced without several of the details of the embodiments described below with reference to FIGS. 2-6.

Figure 1A:
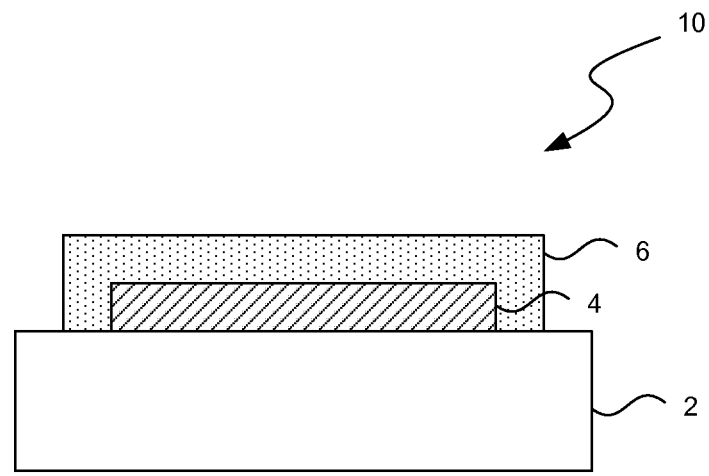
FIG. 1A is a partially schematic cross-sectional view of an SSL device in accordance with the prior art.
Figure 1B:
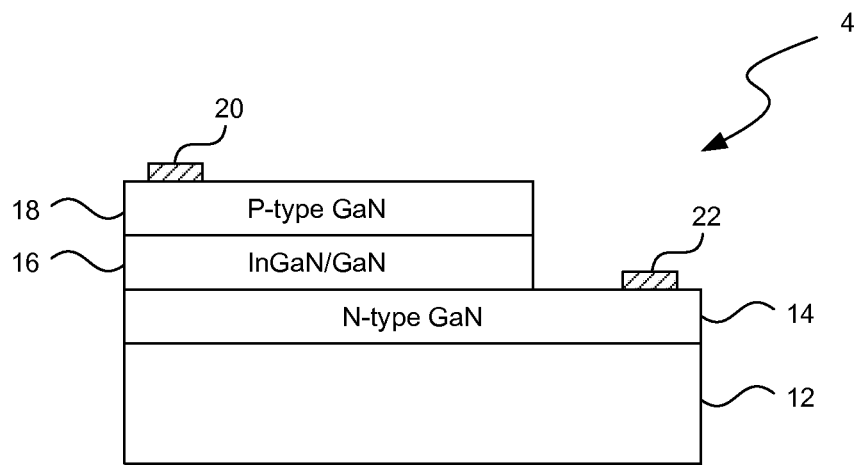
FIG. 1B is a partially schematic cross-sectional view of an LED in accordance with the prior art.
Figure 2:
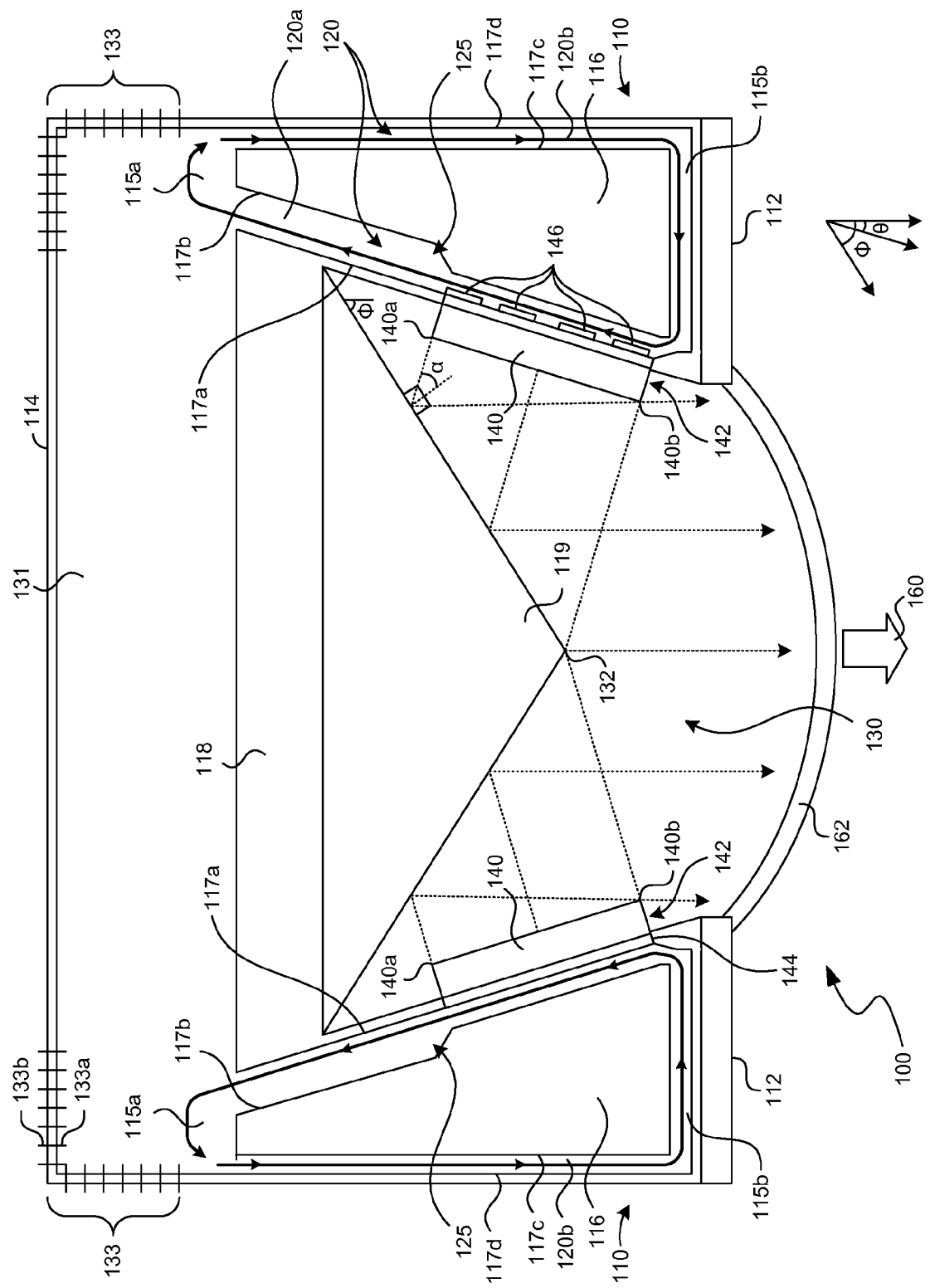
FIG. 2 is a partially schematic cross-sectional view of an SSL device in accordance with embodiments of the present technology.

FIG. 2 is a partially schematic side cross-sectional view of an SSL device 100 according to several embodiments of the present technology. The SSL device 100 can include a housing 110 having a front 112, a back 114, a side section 116 between the front 112 and the back 114, and a base 118 between the side section 116. The side section 116 can include an inner wall 117a, a first intermediate wall 117b, a second intermediate wall 117c, and an outer wall 117d that together define a closed recirculation system for a cooling fluid ("closed-system") channel loop 120. The closed-system channel loop 120 can include a first channel 120a between the inner wall 117a and the first intermediate wall 117b, and a second channel 120b between the second intermediate wall 117c and the outer wall 117d. The closed-system channel loop 120 can also include an upper return 115a in fluid communication with the first and second channels 120a, 120b near the base 118, and a lower return 115b in fluid communication with the first and second channel loops 120a, 120b near the front 112. An area between the base 118 and the back 114 can define a cooling headspace 131 or reservoir where heat can be transferred out of the fluid. The first and second channels 120a-b can both open into the headspace 131. In some embodiments, the upper return 115a comprises a tube portion between the first and second channels that is separate from the headspace 131. The headspace 131 and closed-system channel loop 120 can therefore contain different fluids in such an embodiment. In other embodiments, the closed-system channel loop 120 and the headspace 131 can be filled (or at least substantially filled) with a coolant fluid, such as a dielectric coolant fluid, that circulates through the closed-system channel loop 120 to transfer heat from the inner wall 117a to the fluid in the headspace 131. The back 114 can include a cooling structure 133, including internal fins 133a and/or external fins 133b to increase the thermal transport from the coolant fluid to the external environment. In each of these embodiments, the closed-system channel loop 120 and headspace 131 define an enclosure in which the coolant fluid is contained in and recirculated through an inner environment sealed (or at least substantially sealed) from the external or ambient environment. The housing 110 can include a valve or opening (not shown) through which the cooling fluid can be replenished or replaced if the cooling fluid becomes contaminated or deteriorated or if the SSL device 100 is to be used in a different application requiring a different cooling fluid.

The coolant fluid can have desirable thermal and other physical properties depending on the application of the SSL device 100. For example, the coolant fluid can change phase between the first channel 120a and the upper return 115a, and again as it falls through the second channel 120b to the lower return 115b. In some embodiments, the SSEs 140 can cause the coolant to change from a liquid to a gas state, and the cooling in the upper return 115a and the headspace 131 can cause the coolant to condense into a liquid before returning back through the second channel 120b. The energy required to cause the phase change from liquid to gas is provided by heat from the SSEs 140, and the heat sink of the cooling structure 133 can cause the phase change from gas to liquid.

The properties and quantity of coolant fluid and fluid circulation rate can be selected at least generally according to the amount of energy used by the SSEs 140 in a given configuration because different SSEs 140 and SSE configurations produce different heat loads. Other characteristics of the coolant fluid are independent of SSE energy configuration. For example, the fluid can be dielectric fluid to avoid shorting circuitry of the SSEs 140 and of the SSL device 100.

The housing 110 can also include a chamber 130 defined in part by the inner wall 117a of the side section 116 and the base 118. The chamber 130 can be separate from the closed-system channel loop 120. In other embodiments, described below, the closed-system channel loop 120 can pass through a portion of the chamber 130. The SSL device 100 can further include a reflector 119 mounted to the base 118 in the chamber 130, and a plurality of SSEs 140 mounted to the side section 116 to face the reflector 119. The SSEs 140 can have an active portion 142 that emits light toward the reflector 119 and a back portion 144 mounted to the side section 116. The reflector 119 directs the light from the SSEs 140 along a primary output direction 160. The SSL device 100 can also include a lens 162 over the chamber 130 in the optical path of the primary output direction 160. In some embodiments, the lens, 162, the back 114, and the side sections 116 can contain the coolant fluid. In other embodiments, the closed-system channel loop 120 can be separate from the chamber 130 such that the closed-system channel loop 120 can contain the cooling fluid while the chamber 130 contains another fluid, such as air, or is open to an external environment.

In several embodiments, at least a portion of the SSEs 140 is exposed to the closed-system channel loop 120. For example, the back portion 144 of the SSEs 140 can be exposed in the first channel 120a, which can be oriented at a sufficiently high angle relative to horizontal such that the coolant fluid in the first channel 120a is heated by the SSEs 140 and rises to create a circulating fluid current through the closed-system channel loop 120. This produces a passive, natural cooling flow of coolant fluid across a surface of the SSEs 140. The coolant fluid can be a material that expands or boils when heated at the operating temperatures of the SSEs 140, such that heat from the SSEs 140 causes low pressure in the coolant to induce the fluid to circulate through the closed-system channel loop 120.

In several embodiments, the SSEs 140 can be mounted generally parallel with the first channel 120a. In other embodiments, the SSEs 140 are not necessarily parallel with the first channel 120a, but can be mounted at a sufficient angle relative to horizontal such that warmed fluid in the first channel 120a rises and continues the cooling fluid flow through the closed-system channel loop 120.

In several embodiments, the back 114 and the cooling fins 133 are exposed to ambient air (or another relatively cool environment) that is sufficiently cooler than the SSEs 140 to maintain the temperature of the SSEs 140 within a desired operating range. The first channel 120a can have a first width near the front 112 and a second width near the base 118 to create advantageous fluid pressure in the first channel 120a. For example, the first width can be smaller than the second width to create a Joule-Thompson expansion zone 125 in the first channel 120a to further encourage the fluid to circulate through the closed-system channel loop 120.

In several embodiments the SSEs 140 can be positioned and angled relative to the reflector 119 such that the reflector 119 directs substantially all of the light out of the SSL device 100. For example, the SSEs 140 can emit light directed principally in one direction 160 normal to the surface of the active portions 142 of the SSEs 140. It is generally advantageous to output as much light as possible from the SSL device 100 and still have a compact design. As such, the SSEs 140 can be positioned relative to the reflector 119 such that the reflector 119 directs light from a first edge 140a of the SSEs 140 past a second edge 140b of the SSEs 140. Additionally, the SSEs 140 and reflector can be configured such that light from the second edge 140b of the SSEs 140 is directed at an apex 132 of the reflector 119 to prevent light from the second edge 140b of the SSEs 140 from missing the reflector 119 and striking an opposing SSE 140 (or other component). This arrangement outputs more light from the SSL device 100 and avoids accumulating additional heat in the SSL device 100 that would otherwise occur if light were reflected back into the SSL device 100. In some embodiments, the reflector 119 can be angled relative to the primary direction 160 by a first angle ($\Phi$). The front 142 of the SSEs 140 can be angled relative to the primary direction 160 by a second angle (Θ) and the reflector 119 and the front 142 can be angled relative to one another by a third angle (α). The first angle (Φ) can be approximately equal to the second angle (Θ) plus the third angle (α).

Figure 3A:
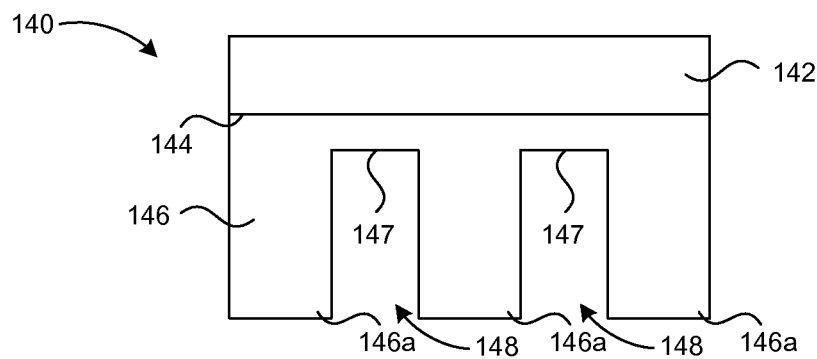
FIG. 3A is a partially schematic side view of an SSE having thermally conductive projections in accordance with embodiments of the present technology.
Figure 3B:
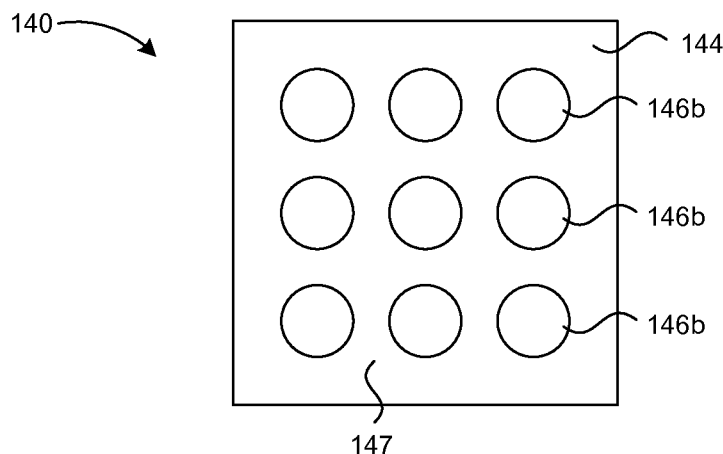
FIG. 3B is a partially schematic back view of an SSE having thermally conductive projections in accordance with embodiments of the present technology.
Figure 3C:
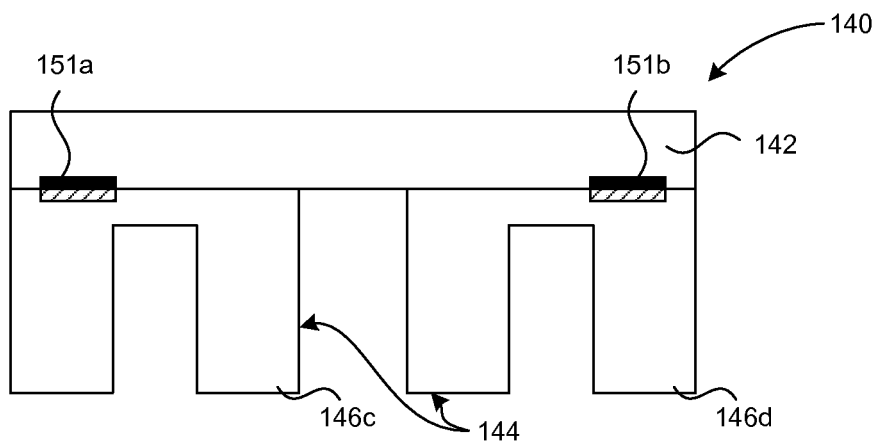
FIG. 3C is a partially schematic side view of an SSE having thermally conductive projections and electrical contacts in accordance with embodiments of the present technology.

The back portion 144 of the SSEs 140 can include a heat sink made of a thermally and/or electrically conductive material, such as copper (Cu), aluminum (Al), or a high-potassium (k) alloy. In several embodiments, the back portion 144 can include projections 146, such as fins, posts, or other features that increase the thermally conductive surface area of the back portion 144 that is exposed in the closed-system channel loop 120. FIGS. 3A-3C illustrate several configurations of the projections 146 according to embodiments of the present technology. FIG. 3A shows a cross-sectional view of an embodiment of a back portion 144 having a shallow section 147 covering the backside of the active portion 142 and several elongated, generally rectilinear projections 146a extending from the shallow section 147. Alternatively, back portion 144 does not need to have the shallow section 147 such that the individual projections 146a can be separated from one another with the backside of the active portion 142 exposed between the projections 146a. The projections 146a can define conduits 148 parallel to the fluid-flow through the first channel 120a (FIG. 2), or they can be angled or otherwise non-parallel with the fluid-flow in the first channel 120a according to known heat transfer techniques.

FIG. 3B is a view of another embodiment of the back portion 144 of the SSE 140 that includes projections 146b comprising a plurality of posts extending from the back portion 144 of the SSE 140. The projections 146b can be arranged in rows and columns, or they can be staggered in other arrangements. As with other embodiments, the projections 146b can project from a shallow section 147 integral with the projections 146b.

Other suitable heat-exchanging structures can be used with the SSE 140. For example, FIG. 3C illustrates another embodiment of the present technology in which the back portion 144 includes projections 146c and 146d made from an electrically conductive material. The active portion 142 of the SSE 140 can include electrical contacts 151a and 151b (e.g., n and p contacts) that are electrically coupled to the projection portions 146c and 146d, respectively. In other embodiments, the projections 146c and 146d can be made from a dielectric material or electrically isolated conductor material and include interconnects electrically connected to the electrical contacts 151a, 151b.

Figure 4A:
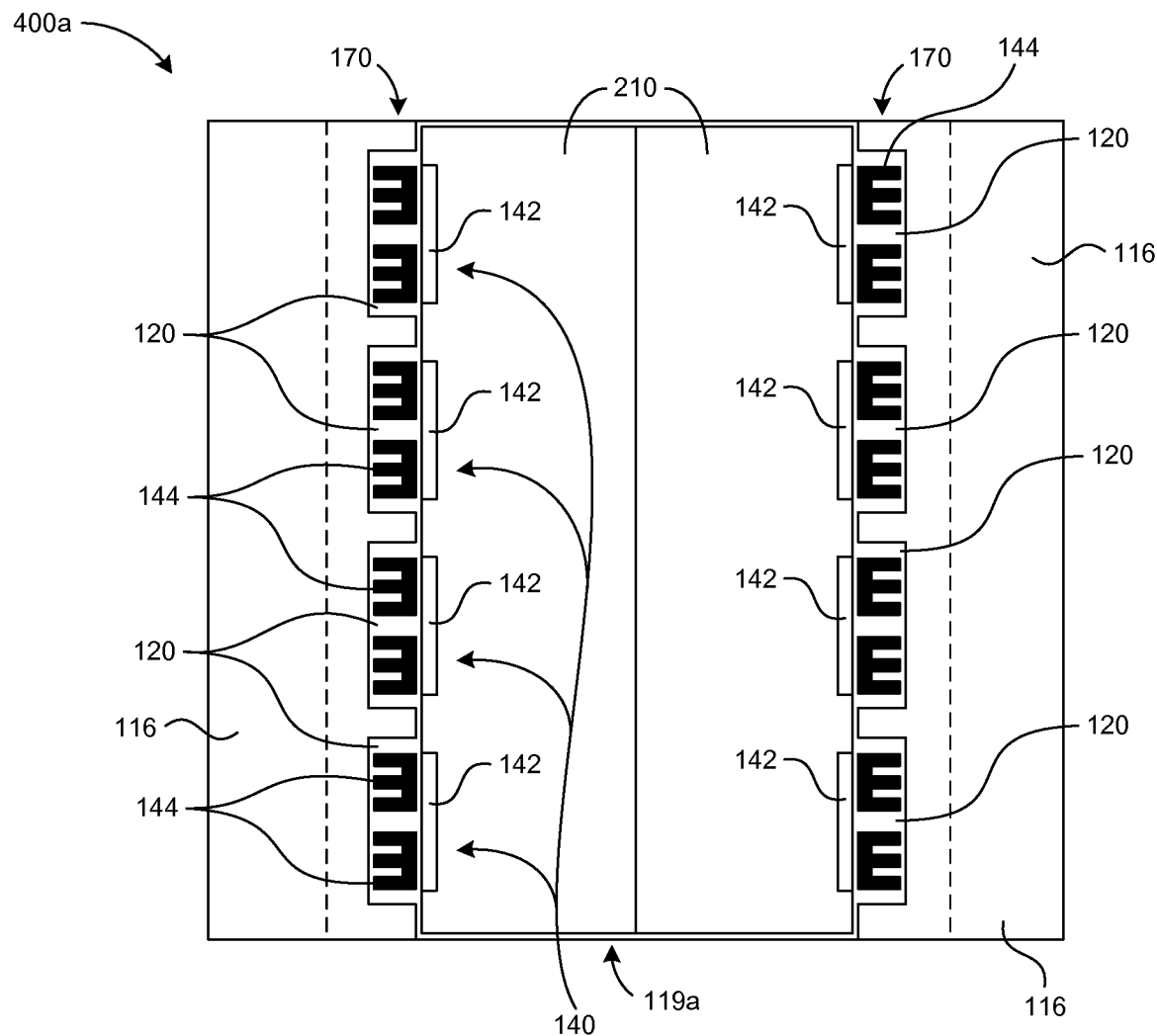
FIG. 4A is a partially schematic bottom plan view of a rectangular SSL device in accordance with other embodiments of the present technology.
Figure 4B:
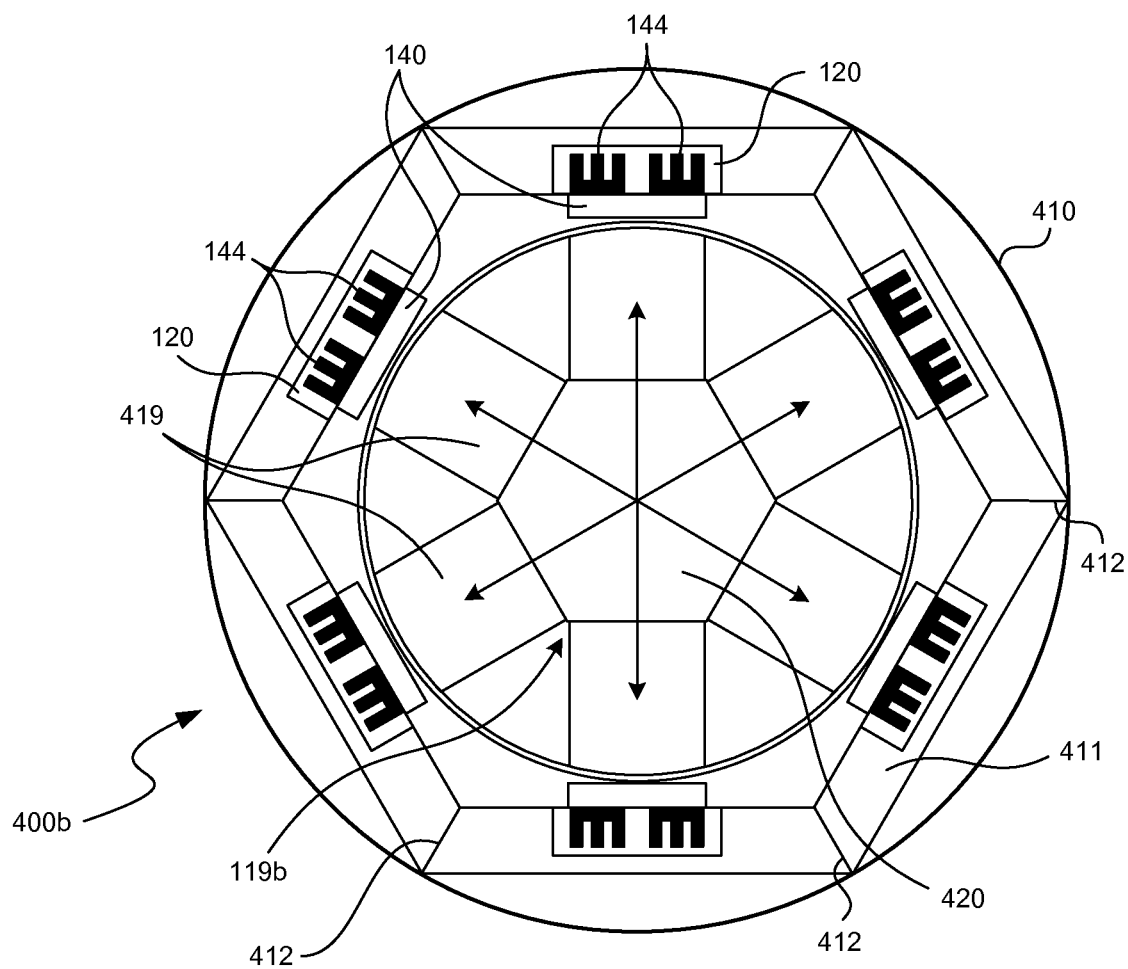
FIG. 4B is a partially schematic bottom plan view of a circular SSL device in accordance with other embodiments of the present technology.

FIGS. 4A and 4B are bottom plan views of specific embodiments of SSL devices 400a and 400b, respectively. More specifically, the SSL device 400a in FIG. 4A is generally rectilinear, and the SSL device 400b shown in FIG. 4B is hexagonal, polygonal, or circular. Like reference numbers generally refer to similar or even identical components in FIGS. 2, 4A and 4B.

Referring to FIG. 4A, the SSL device 400a includes an elongated reflector 119a composed of two generally flat, rectangular reflective surfaces 210. In this embodiment, the SSL device 400a has separate side sections 116, and each side section 116 has a plurality of channels, forming closed-system channel loops 120 as discussed above. The SSEs 140 can be arranged in rows 170 flanking each surface 210 of the reflector 119a such that the active portions 142 face the reflective surfaces 210 and the back portion 144 are in or otherwise exposed to the closed-system channel loops 120. The SSL device 400a can include any suitable number of SSEs 140 arranged in the rows 170.

Referring to FIG. 4B, the SSL device 400b has a rounded or circular housing 410 and a reflector 119b. The reflector 119b can be conical or faceted (e.g., pyramidal). The reflector 119b of the SSL device 400b shown in FIG. 4B, for example, is faceted and includes six facets 419 configured to reflect the light from six corresponding SSEs 140, each of which can have a thermally conductive back portion 144. In other embodiments, however, the SSL device 400b can include any suitable number of facets and SSEs 140. The reflector 119b can also be a truncated faceted structure with a flat top surface 420 defining the apex.

The SSL device 400b can also have a planar support 411 that has beveled edges 412. The angle of the beveled edges 412 can vary according to the number of sides. For example, a configuration with six sides has bevels of 60°. The beveled edges 412 of neighboring supports 411 can abut one another around the SSL device 400. The SSL device 400b can also have one or more SSEs 140 mounted to the planar supports 411. In one embodiment, the SSEs 140 can be mounted to the planar supports 411 using conventional planar mounting techniques and equipment while the supports 411 are flat and before the supports 411 are joined to the SSL device 100. As with other embodiments shown and described above, the SSL device 400b can include one or more closed-system channel loops 120 through which a coolant fluid can circulate to cool the SSEs 140.

Figure 5:
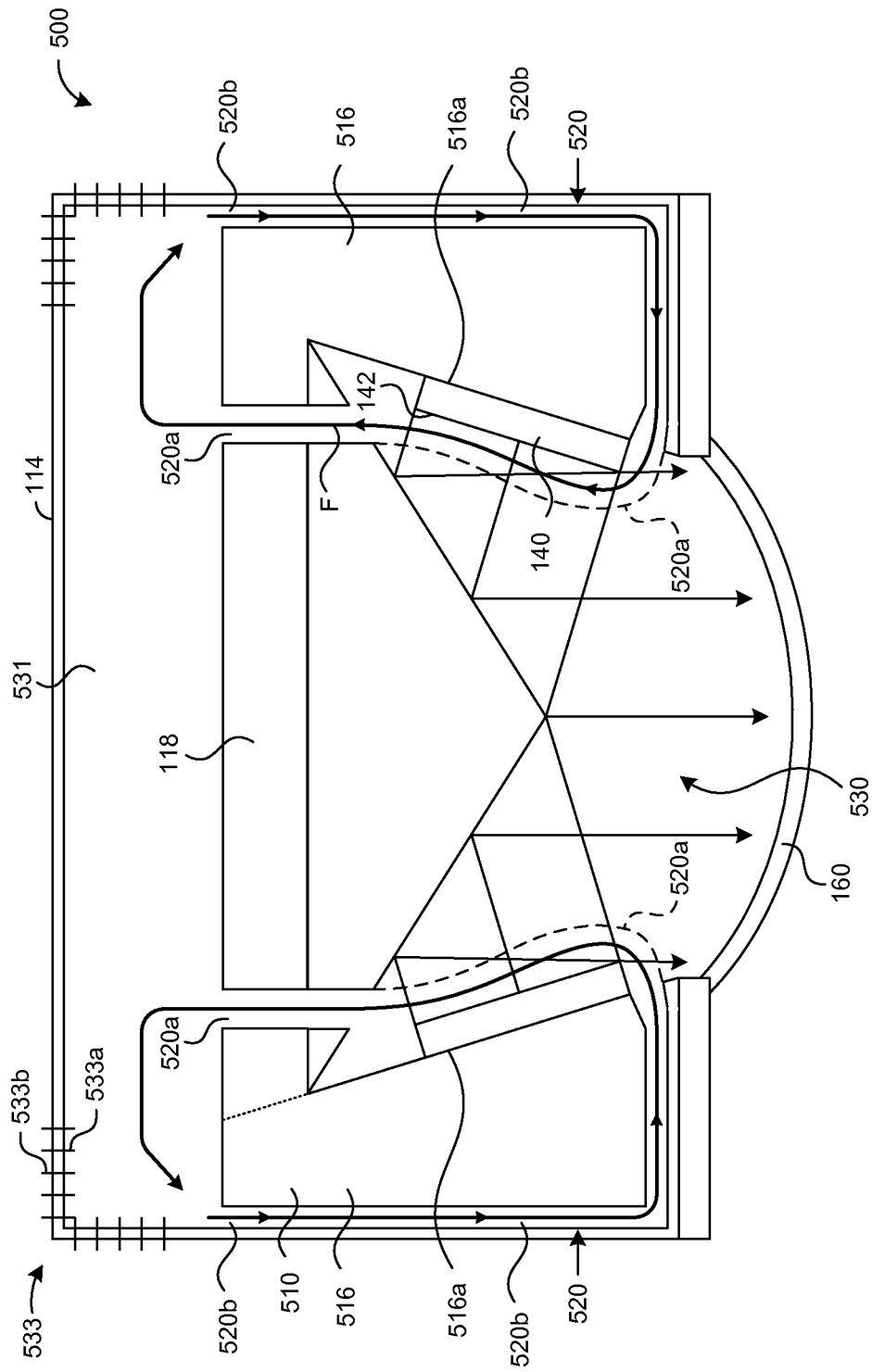
FIG. 5 is a partially schematic cross-sectional view of an SSL device in accordance with embodiments of the present technology.

FIG. 5 shows another SSL device 500 according to several embodiments of the present technology in which the active portions 142 of the SSEs 140 are mounted directly to an inner wall 516a of a housing 510. The side section 516, the base 118, and the lens 160 define a chamber 530 containing a transparent coolant fluid, and can be sufficiently sealed to contain the liquid coolant free from contaminants or leakage. As light from the SSEs 140 passes through the coolant, the coolant can contain particles of converter material suspended or blended within the coolant fluid to augment, alter, or replace the light-altering characteristics of a fixed converter material mounted on or near the SSEs 140. The housing 510 includes a closed-system channel loop 520 having an upward channel 520a and a downward channel 520b. A portion of the upward channel 520a is a "virtual channel" (shown in dotted lines) that extends through the chamber 530 along the inner wall 516a of the side section 516 and over the active portions 142 of the SSEs 140. The flow F eventually reaches a headspace 531 where it cools and, in some instances, condenses. The back 114 forms part of the enclosure of the head space 531 and can include cooling structures, such as fins 533, that can be internal fins 533a and/or external fins 533b. The downward channel 520b passes through the side section 516 downward from the headspace 531 and connects with the upward channel 520a below the SSE 140.

In operation, the SSE 140 produces heat which warms the coolant fluid in the upward channel 520a and causes the fluid to circulate through the closed-system channel loop 520. In this embodiment, the closed-system channel loop 520 and the chamber 530 are not separated, but define a single reservoir of coolant fluid. The SSEs 140 emit light toward the reflector 119 through the coolant fluid. Accordingly, in addition to having desired thermal and electrical properties, the coolant fluid can be transparent. The natural, passive flow of coolant fluid can carry heat from the SSEs 140 to the fins 533 and out of the SSL device 500. In some embodiments, no fluid moving or pressurizing equipment is required in the SSL device 500.

Figure 6:
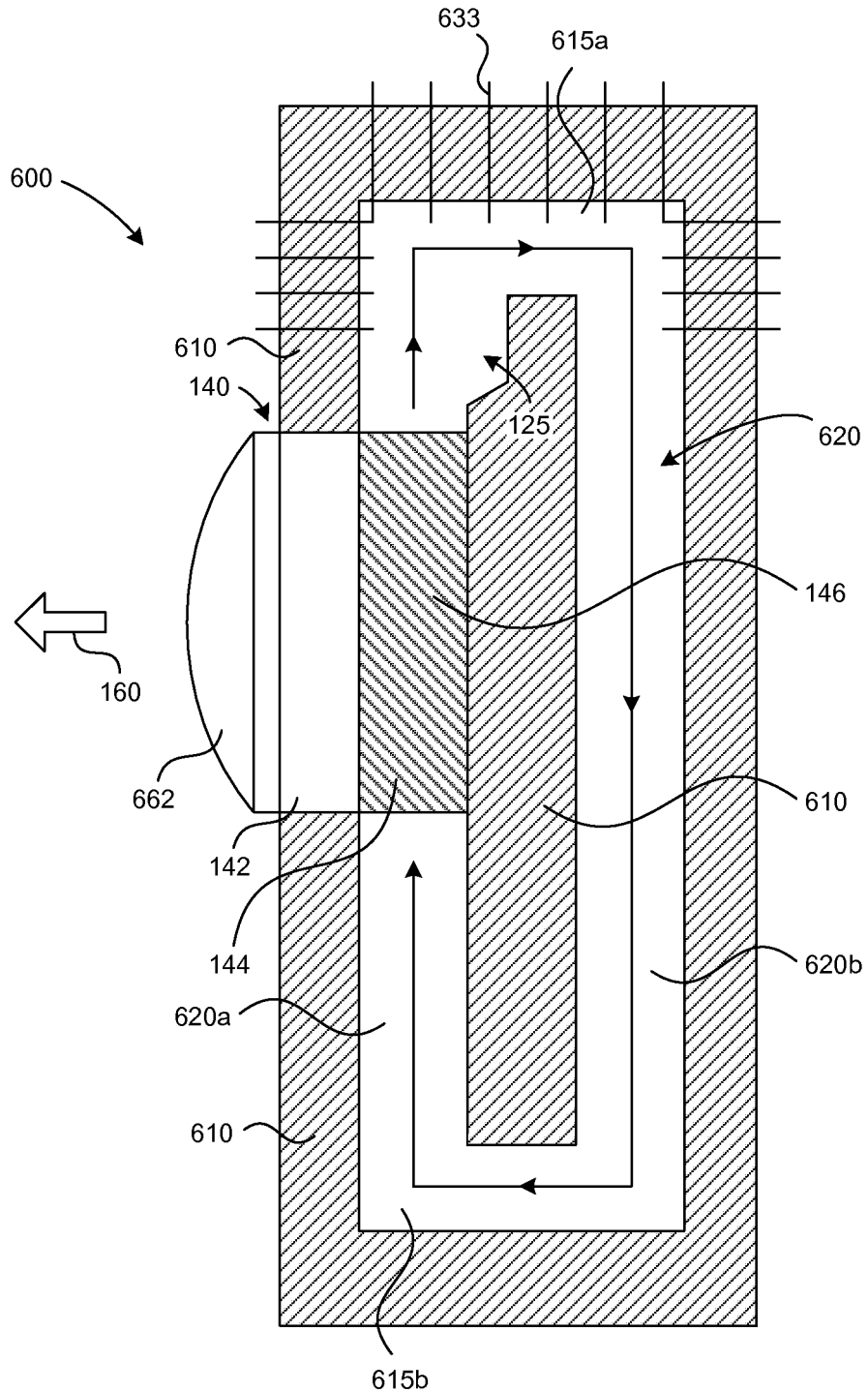
FIG. 6 is a partially schematic cross-sectional view of an SSL device in accordance with embodiments of the present technology.

FIG. 6 illustrates an SSL device 600 in accordance with still further embodiments of the present technology. The SSL device 600 can include an SSE 140 with an active portion 142 and a thermally conductive back portion 144 with projections 146, such as fins or posts, to increase the thermally conductive surface area. The SSE 140 can have a lens 662 aligned with the active portion 142. The SSE 140 can be mounted to a support 610. The SSL device 600 can be situated to emit light in a generally horizontal direction 160 with the support 610 extending generally vertically such as on a wall, in a computer monitor or television set, or in another generally vertical structure. The support 610 can include a closed-system channel loop 620 that contains a liquid coolant and comprises an upward channel 620a passing across the projections 146 and a downward channel 620b opposite the upward channel 620a. The upward channel 620a can be in fluid communication with the downward channel 620b by an upward return 615a above the SSE 140 and a downward return 615b below the SSE 140. The upper return 615a can be bounded by thermally conductive structures, such as fins 633 which may extend into the upper return 615a and/or out of the SSL device 600. Similar to the mechanism described above, heat from the projections 146 causes a natural, passive current in the coolant fluid that brings heat from the projections 146 to the fins 633 and out of the SSL device 600. In some embodiments, the closed-system channel loop 620 can include an expansion zone 125 above the projections 146 to further encourage fluid flow through the closed-system channel loop 620. The projections can be electrically connected to the SSE 140 and to an external contact in the support 610.

The lenses 162 and 662 of the embodiments described above in FIGS. 2-6 can be formed of injection molded silicone or other suitable material. The lenses 162 and 662 can include a converter material such as phosphor. When light from the SSEs 140 passes through the converter material, the converter material emits light of a desired color and quality. The converter material can be placed anywhere in an optical path of the SSEs 140, including on or in the lens 162 or another cover, or separate from a lens or cover. In some embodiments, the converter material can be suspended within a fluid through which light from the SSEs 140 passes. Alternatively, the converter material can be placed in a phosphor well. For example, in one embodiment, the converter material can include a phosphor containing cerium(III)-doped yttrium aluminum garnet (YAG) at a particular concentration for emitting a range of colors from green to yellow to red under photoluminescence. In other embodiments, the converter material can include neodymium-doped YAG, neodymium-chromium double-doped YAG, erbium-doped YAG, ytterbium-doped YAG, neodymium-cerium double-doped YAG, holmium-chromium-thulium triple-doped YAG, thulium-doped YAG, chromium(IV)-doped YAG, dysprosium-doped YAG, samarium-doped YAG, terbium-doped YAG, and/or other suitable phosphor compositions. The lenses 162 and 662 can simply transmit the light from the SSEs 140 and converter material or it can further focus or otherwise alter characteristics of the light.

From the foregoing, it will be appreciated that specific embodiments of the invention have been described herein for purposes of illustration, but well-known structures and functions have not been shown or described in detail to avoid unnecessarily obscuring the description of the embodiments of the invention. Where the context permits, singular or plural terms may also include the plural or singular term, respectively. Unless the word "or" is associated with an express clause indicating that the word should be limited to mean only a single item exclusive from the other items in reference to a list of two or more items, then the use of "or" in such a list shall be interpreted as including (a) any single item in the list, (b) all of the items in the list, or (c) any combination of the items in the list.

Also, it will be appreciated that specific embodiments described above are for purposes of illustration and that various modifications may be made without deviating from the invention. Aspects of the technology described in the context of particular embodiments may be combined or eliminated in other embodiments. For example, a pump can be replaced with other fluid circulating mechanisms. Further, while advantages (e.g., heat dissipation mechanisms) associated with certain embodiments of the technology may have been described in the context of those embodiments, other embodiments may also exhibit such advantages, and not all embodiments need necessarily exhibit such advantages to fall within the scope of the technology. Accordingly, the present technology and associated technology can encompass other embodiments not expressly shown or described herein.

We claim:

1. A lighting device, comprising:
   a housing including a fluid chamber having a plurality if channel loops;
   a coolant fluid in the fluid chamber;
   solid state emitters (SSEs) each including an active portion from which light is emitted and a back portion, wherein at least one of the active portion and the back portion directly contacts the coolant fluid in one of the channel loops; and
   a reflective structure positioned between the SSEs, wherein the reflective structure is configured to direct light emitted by each of the SSEs out of the lighting device while the coolant fluid in each of the channel loops is heated by the least one of the active portion and the back portion to circulate the coolant fluid along the respective channel loops.

2. The lighting device of claim 1, further comprising a cooling structure coupled to the housing, the cooling structure including at least one fin extending into the fluid chamber to directly contact the coolant fluid.

3. The lighting device of claim 1, wherein each of the channel loops includes a channel configured such that the coolant fluid flows upwardly through the channel and past at least one of the SSEs to transfer heat away from the at least one of the SSEs when the channel is at a substantially vertical orientation.

4. The lighting device of claim 3 wherein at least one of the channels is positioned between at least one of the SSEs and the reflective structure such that the coolant fluid passes between the at least one of the SSEs and the reflective structure when the coolant fluid flows along the channel.

5. The lighting device of claim 1 wherein the coolant fluid flows across the active portions of the SSEs when the coolant fluid travels along the channel loops.

6. The lighting device of claim 5 wherein the coolant fluid is substantially transparent, and the SSE is positioned relative to the housing such that light emitted by the SSE travels through the coolant fluid and out of the lighting device.

7. The lighting device of claim 1 wherein the active portion of at least one of the SSEs directly contacts the fluid.

8. The lighting device of claim 1 wherein the back portion of at least one of the SSEs directly contacts the fluid.

9. The lighting device of claim 1 wherein the SSEs are positioned along the channel loops such that heat generated by the SSEs is transferred to the coolant fluid and causes thermosiphoning by circulating the coolant fluid about the channel loops and along the at least one of the active portion and the back portion.

10. A lighting device, comprising:
a housing having a fluid chamber holding a coolant fluid, the fluid chamber including a main chamber and a plurality of channel loops, the individual channel loops having an inlet positioned to receive the coolant fluid from the fluid chamber and an outlet positioned to output the coolant fluid to the main chamber;
a cooling structure configured to transfer thermal energy from the coolant fluid in the fluid chamber, the cooling structure including at least one heat transfer fin positioned in the fluid chamber to directly contact the coolant fluid;
a reflective structure; and
solid state emitters (SSEs) configured to emit light toward the reflective structure such that the reflective structure directs the emitted light out of the lighting device, wherein each of the SSEs is coupled to the housing such that heat generated by the SSEs is transferred to the coolant fluid in one of the channel loops and causes the coolant fluid to flow along the channel loops.

11. The lighting device of claim 10 wherein the cooling structure includes at least one external fin exposed outside the lighting device.

12. The lighting device of claim 10, wherein at least one of the channel loops comprises:
a first channel having a first inlet and a first outlet;
a second channel having a second inlet and a second outlet;
a first return between the first outlet and the second inlet; and
a second return between the second outlet and the first inlet.

13. The lighting device of claim 12, wherein when the first channel is at a generally vertical orientation, the first channel is oriented such that the coolant fluid in the first channel is heated by the SSEs and rises to induce a fluid current in the channel loop to cause the coolant fluid to flow upwardly through the first channel and downwardly through the second channel.

14. The lighting device of claim 10 wherein the SSEs include one or more fins that contact the coolant fluid.

15. The lighting device of claim 10 wherein when at least a section of the channel loop is at a generally vertical orientation, the channel loop is configured such that coolant fluid heated by at least one the SSEs flows upwardly along the SSE and coolant fluid cooled by the cooling structure flows along the channel loop towards the SSE.

16. The lighting device of claim 10 wherein heat from the SSEs sufficient to cause a first phase change in the coolant fluid and the cooling structure is configured to cause a second phase change in the coolant.

17. The lighting device of claim 10, wherein the channel loop includes a channel configured such that the coolant fluid in the channel flows vertically past at least one of the SSEs to transfer heat away from the SSE when the channel is at a substantially vertical orientation.

18. The lighting device of claim 10 wherein the SSEs are configured to produce a sufficient amount of heat to cause a convective flow of the coolant fluid in the channel loops.

19. A lighting device, comprising:
a housing including a fluid chamber holding a coolant fluid, the fluid chamber having a plurality of channel loops through which the coolant fluid is capable of independently flowing;
a reflective structure within the housing; and
a plurality of solid state emitters (SSEs) within housing, wherein the SSEs are configured to emit light toward the reflective structure, wherein each of the SSEs is positioned along one of the channel loops such that heat is transferred from the SSE to the coolant fluid to cause thermosiphoning by circulating the coolant fluid through the one of the channel loops while the reflective structure directs light from the SSEs out of the lighting device.

20. The lighting device of claim 19 wherein the SSEs directly contact the coolant fluid in the housing.

21. The lighting device of claim 19, further comprising a cooling structure configured to transfer thermal energy away from the coolant fluid, and the cooling structure including at least one heat transfer fin positioned in the fluid chamber to directly contact the coolant fluid.

22. The lighting device of claim 19 wherein each of the SSEs includes a plurality of projections extending into a respective one of the channel loops, and wherein the plurality of projections are spaced apart to define flow channels through which the coolant fluid flows.

23. The lighting device of claim 22 wherein the projections are fins.

* * * * *